Oct. 1, 1935.  C. G. ADSIT  2,015,915
VALVE STRUCTURE
Filed March 2, 1933  3 Sheets-Sheet 1
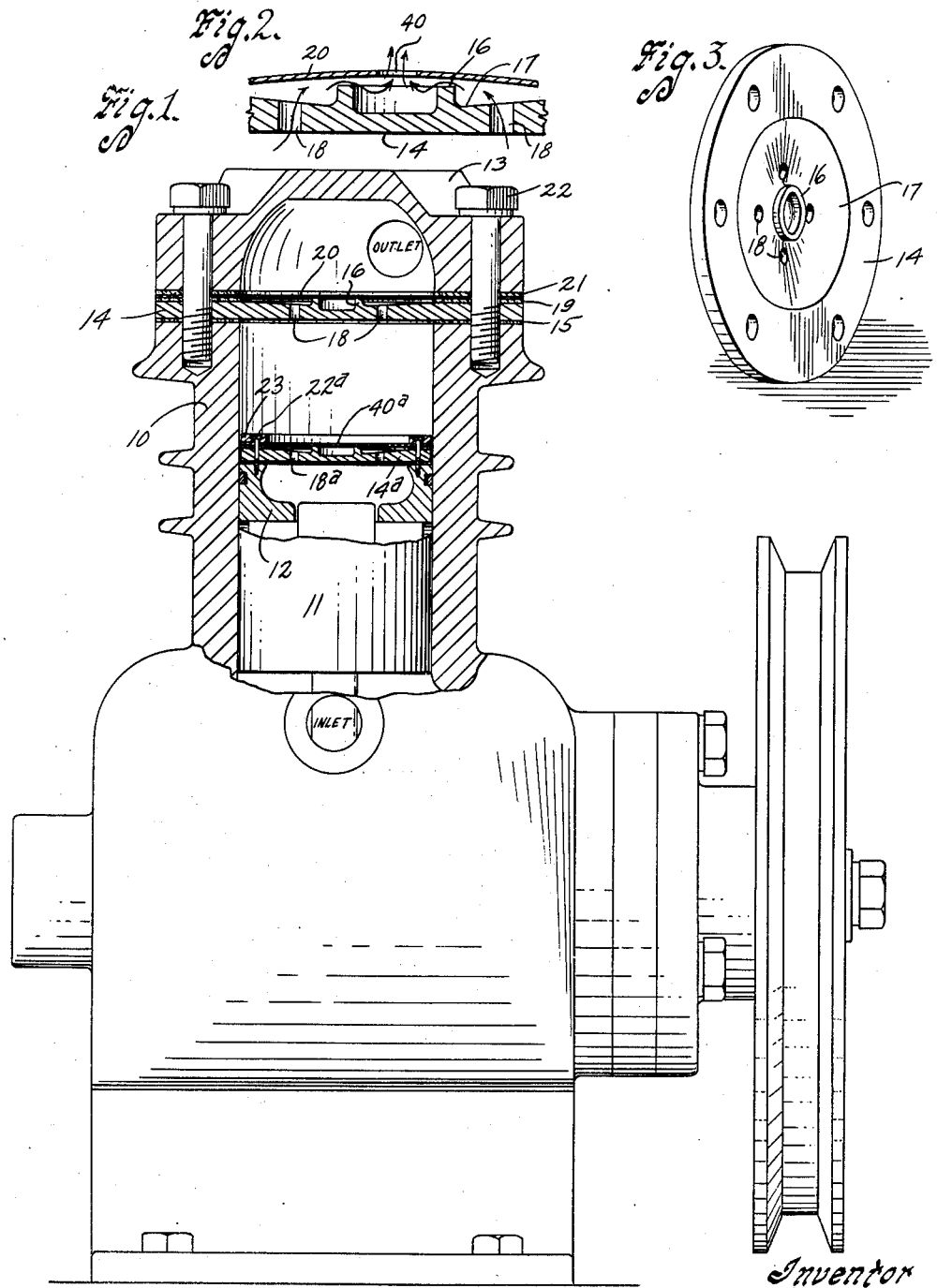

Oct. 1, 1935.   C. G. ADSIT   2,015,915
VALVE STRUCTURE
Filed March 2, 1933   3 Sheets-Sheet 2
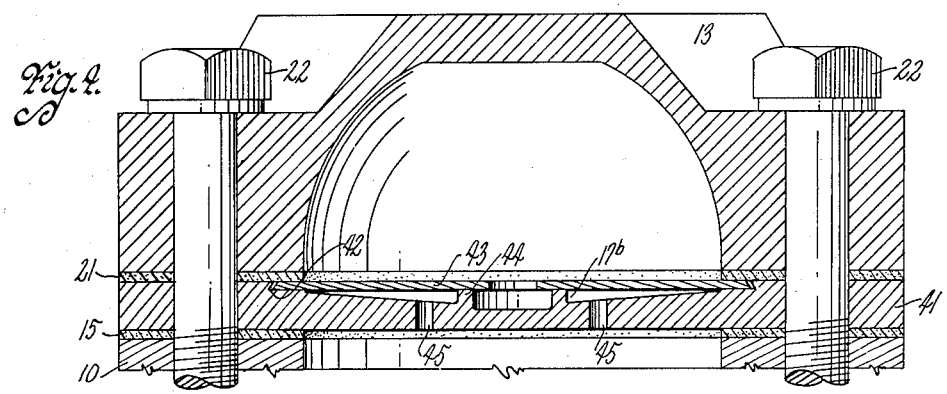
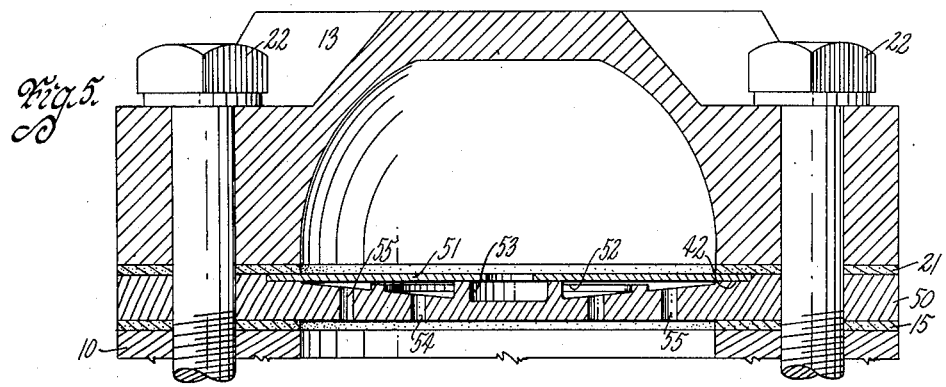
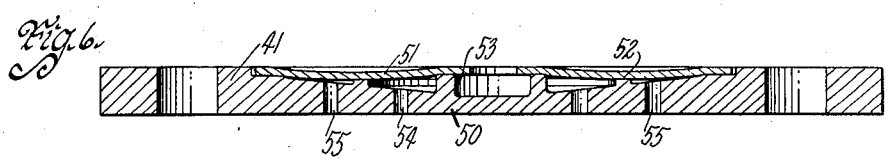
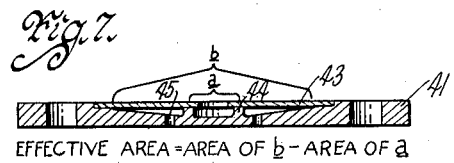
EFFECTIVE AREA = AREA OF b - AREA OF a
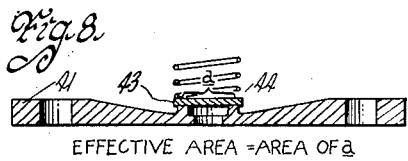
EFFECTIVE AREA = AREA OF a Oct. 1, 1935.   C. G. ADSIT   2,015,915
VALVE STRUCTURE
Filed March 2, 1933   3 Sheets-Sheet 3
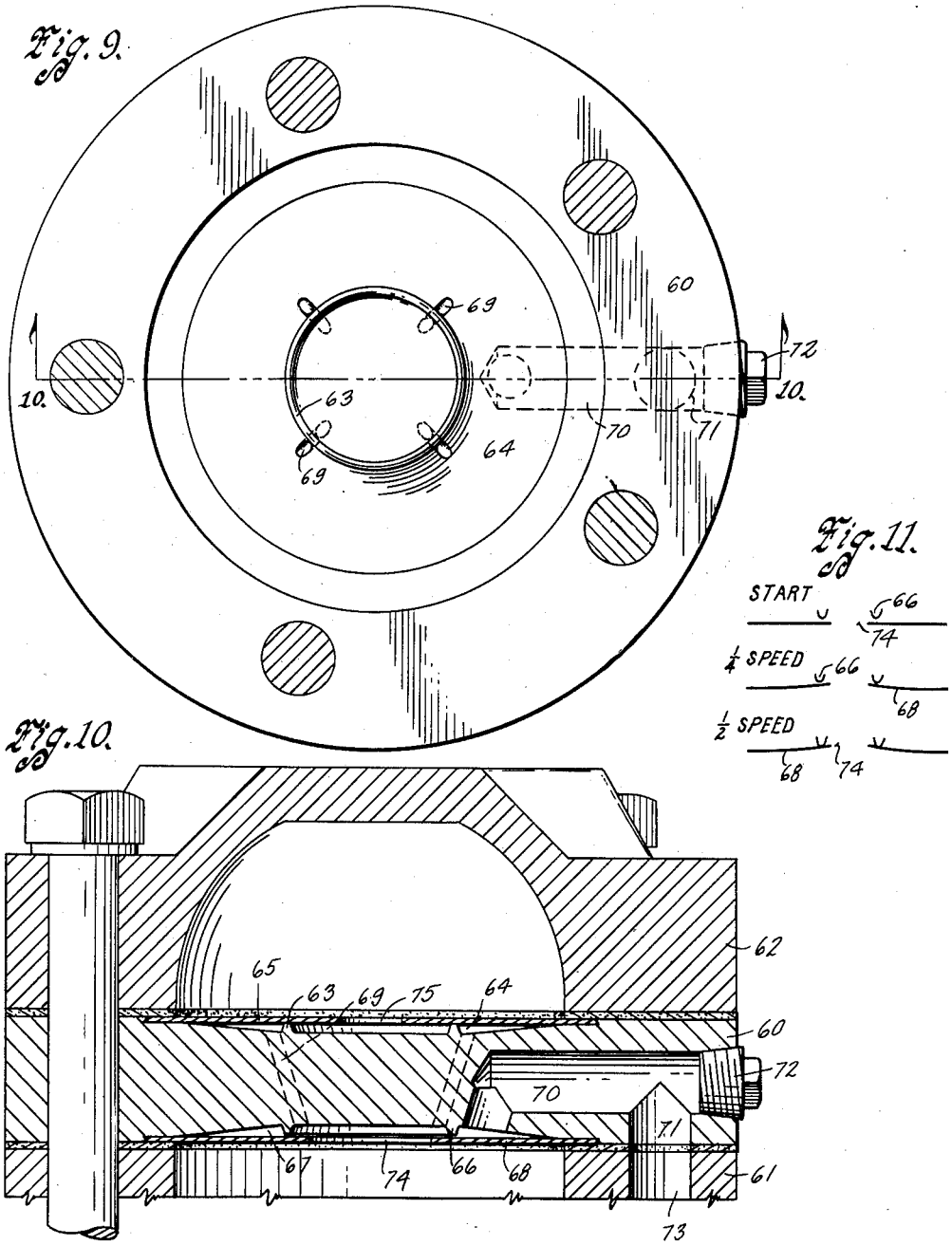
Inventor
Charles G. Adsit
By Bair, Freeman & Sinclair
Attorneys
Witness
H. S. Munzenmaier Patented Oct. 1, 1935

2,015,915

UNITED STATES PATENT OFFICE 2,015,915

VALVE STRUCTURE

Charles G. Adsit, Des Moines, Iowa

Application March 2, 1933, Serial No. 659,365

6 Claims. (Cl. 277—61)

My invention relates to valve structures adapted for use in pumps or the like.

It is the purpose of my invention to provide in such a valve structure a valve preferably in the form of a resilient metal disc, and to provide a supporting plate in association therewith, having a projecting annular valve seat, and provided with a passage or passages, whereby maximum areas of the valve may be subjected to pressure for insuring the tight seating of the valve at the proper times during all conditions of operation.

A further object is to provide a very simple and inexpensive and efficient valve structure in which a single plate supports both the intake and outlet valves.

Another purpose is to provide such a structure in which the parts are so arranged as to permit one valve to delay closing when the motor is started so as to reduce the starting load on the motor on the first up-stroke of the piston.

With these and other objects in view, my invention consists in the construction, arrangement and combination of the various parts of my valve structure, whereby the objects contemplated are attained, as hereinafter more fully set forth, pointed out in my claims, and illustrated in the accompanying drawings, in which Figure 1 is an elevation partly in vertical section illustrating a compressor cylinder and piston equipped with valve structures embodying my invention.

Figure 2 is an enlarged vertical, sectional view illustrating parts of my improved valve structure.

Figure 3 is a perspective view of the supporting plate.

Figure 4 is a vertical sectional view illustrating a modified and preferred form in which my invention may be embodied.

Figure 5 is a vertical sectional view through a different form of my valve structure in which means are provided for supporting the valve at points spaced outwardly from the valve seat.

Figure 6 is a detailed, vertical sectional view of part of the structure shown in Figure 5, illustrating the function of the supporting means.

Figures 7 and 8 are vertical, sectional views somewhat diagrammatic for the purpose of illustrating the functioning of my valve in comparison with prior type valves shown.

Figures 9 is a top or plan view of still another form in which my improved valve structure may be embodied.

Figure 10 is a detailed, sectional view taken on the line 10—10 of Figure 9; and Figure 11 is a diagrammatic view illustrating the operation of one of the valve members in delay closing to relieve the load on the motor during starting.

I have shown my valve used in connection with a compressor, such for instance as that employed in mechanical refrigerators. The reference numeral 10 indicates the cylinder in which is mounted the piston 11, having the head 12 through which the fluid is pumped. The cylinder has the removable head 13.

My improved valve consists of a plate 14, which in the present instance is annular in form. The lower surface of the plate when used in the present environment is flat and rests above the gasket 15 on the piston 10 below the head 13.

The supporting plate 14 has a central, upwardly extending annular valve seat 16. The upper surface of the plate around the valve seat is chamferred for forming a recess 17 surrounding the seat 16. The recess 17 is preferably deepest adjacent the seat and the surface tapers upwardly from the seat to the outer edge of the chamfered portion.

The plate 14 has a series of passages 18 extending through it from the chamfered portion to the opposite face.

Above the plate 14 is a gasket 19 on which rests a resilient metal disc 20, which forms the valve. The valve 20 has a central hole 40 of less diameter than that of the valve seat 16.

Above the disc is a gasket 21 upon which rests the head 13. The parts are so arranged that when they are in normal position, the valve disc 20 is flat and rests snugly on the seat 16.

The piston head 12 is provided with a similar valve structure. The parts of the valve structure in the piston head are indicated by the same reference numerals as those applied to the valve at the top of the cylinder with the addition of the letter "a".

The cylinder head and the cylinder and the valve structure are secured together by means of bolts 22. The valve structure for the piston head does not, of course have any head, but for holding the parts in place is provided with an upper annular ring 23, and bolts 22a.

In Figure 4 I have shown a slightly different form of supporting plate and valve. The supporting plate is indicated at 41 and is similar to that already described.

It has the chamfered portion 17b generally similar to the chamfered portion 17. However, at the periphery of the chamfered portion 17b, there is an annular rabbet 42, the depth of which is equal to the depth of the steel disc valve 43, which in the compressor shown is .010 to .015 inch thick. The outer edge of the valve 43 rests in the annular rabbet 42. The bottom of the rabbet 42 is exactly level with the top of the annular upstanding valve seat 44, which is similar to the seat 16. Holes 45 are provided similar to the holes 18.

The plate 41 is installed at the top of the cylinder above the gaskets 15.

In the installation shown in Figure 4, there is no gasket below the valve 43, but there is the gasket 22 above it, as already explained.

In the construction shown in Figure 4, the valve rests on the metal surface of the plate. It will always then be normally flat and normally seated without any pressure on the seat caused by any tension of the valve itself.

Again referring to Figure 4, the tapering space 17b has two functions:—one for passing the fluid from aperture 45 across the valve seat into the pressure chamber; and the other function is to form a backing for the valve plate 43 should the pressure in the pressure chamber become excessive and cause the disc to bend downward to a greater degree than is necessary. As the disc is bent downward, the unsupported area exposed to pressure will become less due to the shortened diameter of the free area of the plate on which the valve disc rests. The lower contour of this space 17b may be either straight or curved to perform this function, preferably convex.

For convenience in assembly, the wall of the rabbet 42 may be slightly undercut as indicated in Figure 4 and in Figure 10, so that the valve disc may be sprung and snapped into position in the rabbet and will thereafter be held in place by its own resiliency, so that there may be thus formed a complete assembled unit.

The structure shown in Figure 5 is similar to that shown for instance in Figure 4 with exceptions to be mentioned. The plate is indicated at 50 and the valve at 51. The plate 50 is similar to the plate 41, except that it has in its chamfered portion an annular upstanding rib 52, the upper surface of which is slightly below the level of the face of the valve seat 53, and is intended to support the valve 51, in case the large area thereof around the valve seat should tend to buckle downwardly. I have shown the plate 50 with holes 54 between the valve seat and the rib 52, and also with holes 55 outside the supporting rib 52. The rib is shown as annular, but radial ribs might be used.

In Figure 6 I have shown the structure illustrated in Figure 5 with the valve 51 buckled downwardly as at A and supported by the rib 52.

Where my type of valve is employed, it is desirable in lapping the valve seat to make its face convex and the valve will seat properly in spite of slight distortions of the valve disc.

I shall now refer to the operation of the valve at the top of the cylinder. Ordinarily the valves used in an apparatus of this kind are such that the pressure from below on the valve is determined by the pressure in the cylinder and the area of the passage through the valve. Similarly the pressure on the valve from above is determined by the pressure from above and the area of the valve port.

Heretofore many valves have employed springs for holding them seated and most valves have been unsatisfactory because of the difficulty of insuring proper seating on the down stroke of the piston and when the compressor is not operating.

When sufficient pressure by springs or otherwise has been provided for holding such prior art valves satisfactorily seated, there has been too much resistance to the raising of the valve when the piston was on its up stroke.

It will be seen from the above description of my improved valve that on the upstroke, the fluid may be forced through the passages 18 and the under side of the valve will be subject to pressure against its whole area immediately above the chamfered portion 17 of the supporting plate 14, except for the area within the valve seat. Thus instead of having the pressure on the valve disc that might ordinarily be obtained through the port in a valve seat I am able to multiply that pressure many times.

Many compressors of the kind under consideration are of small bore and the resistance of the valve action greatly reduces the efficiency of the compressor.

With my structure such as is shown here, the effective pressure on the under side of the valve during the up stroke of the piston is such as to make the valve raise with a minimum of resistance to the operation of the piston. This reduces the load on the compressor and assures the movement of a greater volume of fluid at each stroke of the piston.

As compared with valves heretofore used, my valve permits pressure from above on the valve disc for the full area of the chamfered portion, which in the form of the device illustrated is the full area of the cylinder.

It is thus possible to take advantage of great pressure for holding the valve on its seat.

I find in actual practice with a structure here provided, no spring or springs are necessary to hold this valve absolutely tight under normal operating conditions. With prior valves where the pressure on the valve seat is less, difficulty is found in keeping them tightly seated during the down stroke of the piston or during the periods when the compressor is at rest. Any foreign matter, such as bits of carbon, moulding sand, shreds of gaskets or the like, may lodge on the valve seat of the old valve type and hold it open so that it will leak back on the intake stroke of the compressor. In the case of domestic refrigerator compressors, this has been a source of many service repairs and of temporarily stopping the refrigerating cycle. It has been found in practice that with my valve, here shown, the pressure on the valve seat will be so great as to crush any foreign particles and permit the valve to seat perfectly tight. Any foreign material left on the valve seat after such an operation will be blown off on the next upward stroke of the piston.

The advantages of my valve may be made clearer by means of an illustration.

Assume a valve operating on the principle of former valves, a prior valve, with a plate like the plate 14 of Figure 1, but omitting the holes 18 and providing a hole through the plate concentric with the valve seat and within it, and assume a valve disc 43 imperforate above the valve seat, and spring pressed toward the seat. Such a valve is illustrated in Figure 8. During the action of a valve of this nature, the pressure required to raise and open the valve is considerably more than that above the valve disc. The pressure necessary for closing the valve on the downward stroke of the piston will be determined by the area within the valve seat and the spring pressure.

For the sake of comparing my valve with those I have called "prior valves", I will take one with the same diameter of annular valve seat,—for instance one of a diameter of one-half inch, and will assume that the head pressure is 80 pounds per square inch.

The pressure on the prior valve shown tending to close it from above will be proportionate to the area within this one-half inch valve seat. And this area on calculation is found to be approximately $\frac{2}{10}$ths of a square inch. Therefore the pressure on this valve seat will be $\frac{2}{10}$ths of any pressure per square inch exerted from above—to-wit in the illustration, 16 pounds.

On my valve, the effective pressure to close this valve and to press against the valve seat is not the area within the valve seat, but the total exposed area of the disc less the area within the valve seat, and if we assume this disc to have a diameter as illustrated in my drawings, it will have an area something over two square inches, which will be subjected to an effective downward pressure of approximately ten times the downward pressure against the prior valve seat, or in the present illustration 160 pounds for a valve plate area of two square inches.

Thus with my valve, I am able to obtain an effective pressure on a valve seat of one-half inch diameter of 160 pounds.

As stated before, during the action of the prior valve whether it be of a disc type, ribbon type, feather type, etc., the pressure required to open from below is slightly more than that above the valve disc, plus any spring pressure, should closing springs be used. This same characteristic is attained also in my valve so that my valve requires no more discharge pressure to open the valve for discharge purposes than the prior valve without springs but obtains ten times more pressure on the valve seat than the prior valve in the closing operation; therefore, its action is equivalent to having no spring on the disc at the time of opening for discharge purposes and having a very heavy spring at the time of closing.

Due to the great difference in pressure tending to close my valve, the disc need not be in contact with its seat at times of no pressure, but may be within limits free and clear of the valve seat. Yet the first few complete strokes of the piston will close the valve. With prior valves of the type used by way of illustration, the pressure from above is so much less that there is not nearly the same tendency to seat the valve, if it normally stands above the seat, due to inaccuracies of manufacture or otherwise bent or scratched discs.

In refrigerator compressors, for instance, at certain times there are increased quantities of oil passed through the valves with the gas and in such instances the valve must open more widely than with the gas alone. With prior valves this opening movement must be limited in some manner or the valve will continually slap the seat and be objectionably noisy. My valve has been found to be absolutely free from this difficulty and its movement need not be restricted. It operates practically noiselessly at all times with no special means of restricting its movement.

In Figures 9 and 10, I have shown still another form in which my invention may be embodied. I have here illustrated a unit comprising a supporting plate and both an intake and an outlet valve so arranged that the single unit may embody the entire valve structure.

In the form of my invention shown in these figures, I have shown the supporting plate 60 arranged between the upper end of the cylinder 61 and the head 62.

In this embodiment of the invention, the inlet valve is on the bottom of the plate and the outlet valve on the top. The outlet valve is the same as that shown, for instance, in Figure 4 with the valve seat 63, the chamfered portion 64 inclined upwardly and outwardly from the valve seat and the disc valve 65.

On the underside of the plate 60 is a similar construction with the valve seat 66, the chamfered portion 67 and the disc valve 68.

I provide one or more passages 69 extending from within the lower valve seat to the upper chamfered portion outside of the valve seat.

An intake passage 70 extends from the chamfered portion 67 to a branch passage 71 and thence to the lower face of the plate.

The passage 70 also extends to the outer or peripheral face of the plate and in the present embodiment is there closed by a plug 72.

Where the form of valve shown in Figures 9 and 10 is employed, some means is provided for conducting fluid from the crank case to the chamfered portion 67.

In the present instance, I have shown a passage 73 in the wall of the cylinder for this purpose.

In the use of the valve structure now being described the fluid is drawn through the passages 73, 71 and 70 into the space formed by the chamfered portion 67 and thence over the valve seat 66 and through the hole 74 in the valve 68 into the cylinder above the piston, on the down stroke of the piston, and on the up stroke of the piston, the fluid is forced through the hole 74 and the passage 69 over the valve seat 63 and through the opening 75 in the upper valve.

It is obvious that the plug 72 may be omitted and that the passage 70 connected with a different source of gas or fluid supply. The passage 71 might be connected with a source of supply located elsewhere than in the crank case. Thus the arrangement suggested may be employed for pumping two gases or liquids. It will be seen that more than one such passage as that indicated at 70 may be adopted for such purposes.

This structure provides an installation which may be quickly and easily made and is simple and efficient for manufacturing and assembling process.

It may be noted that the valve 68 is so arranged that it is normally slightly spaced above the valve seat 66. In the compressor shown in the drawings, .001 inch has been found sufficient clearance. This structure in the present embodiment of my invention has decided advantages. For instance, when the motor starts and the piston movement is relatively slow, the fluid in the upper part of the piston chamber is not so quickly compressed and escapes through the clearance mentioned above past the valve seat 66 and through the passage 70 until the motor picks up sufficient speed.

In Figure 11, I have illustrated the operation of the valve in starting the motor. When the motor first starts, the valve is not on its seat, and therefore the fluid is pumped back into the crank case. As the motor picks up speed, the valve tends to be pressed toward the valve seat 66 and at a certain point in the speed of the motor, the upstroke of the piston closes the valve on the seat 68 and the normal operation begins. This arrangement of the valve serves as an unloading device or load relieving device for the motor when starting the compressor.

The arrangement of the valve is also such that when the compressor is at rest and the pressure increases in the crank case, but pressure above and below the piston will be automatically equalized or balanced.

It is obvious that while I have described the head and the piston, each provided with one valve, there may be situations where a plurality of valves may be used in either—and, while I have described in general a circular valve, the valve may take any other form—circular, square, oval, oblong or otherwise.

Changes may be made in the construction and arrangement of my improved valve and in the materials used and the installation arrangement adopted, so long as the essential features are not departed from, and it is my intention to cover by my claims any modifications in the nature of the materials used, construction and arrangement of parts, or mode of installation, which may be reasonably included within the scope of my invention and of my claims.

I claim as my invention:

1. In a device of the kind described, a fixed supporting plate having on each side an annular projecting valve seat and a recessed portion of substantially greater area than that within the outline of the valve seat, surrounding the valve seat, a resilient disc valve associated with each seat sealed around its outer edge to the plate and provided with a passage within the outline of its valve seat, said plate having an opening through it extending from said portion on one side to a point within the valve seat on the other side.

2. In a device of the kind described, a fixed supporting plate having on each side an annular projecting valve seat and a recessed portion of substantially greater area than that within the outline of the valve seat, surrounding the seat, a resilient disc valve associated with each seat sealed at its outer edge to the plate beyond the recessed portion and provided with a passage within the outline of its valve seat, said plate having an opening through it extending from the recessed portion on the one side to a point within the valve seat on the other side and having an inlet passage opening into the recessed portion on said other side.

3. In a device of the kind described, a fixed supporting plate having on each side an annular projecting valve seat, a recessed portion surrounding the valve seat of substantially greater area than that within the outline of the valve seat, resilient disc valves associated with the respective seats and sealed respectively adjacent their peripheries to the plate, each valve having a passage within the outline of its valve seat, said plate having an opening extending through it from the recessed portion on one side to a point within the valve seat on the other side, the valve disc on said other side being normally and definitely spaced from the valve seat.

4. In a device of the kind described, a fixed supporting plate having on each side an annular projecting valve seat and a recessed portion of substantially greater area than that within the outline of the valve seat, surrounding the valve seat, a resilient disc valve associated with each seat sealed adjacent its periphery to the plate and provided within the outline of its valve seat with a passage, said plate having an opening through it extending from the recessed portion on one side to a point within the valve seat on the other side and having an inlet passage opening into the recessed portion on said other side, the valve disc on said other side being normally spaced from the valve seat.

5. In a valve structure, a supporting plate having on one face a projecting substantially annular valve seat and a recessed portion surrounding the valve seat and a rabbet of less maximum depth than the recessed portion surrounding the recessed portion, and a raised portion surrounding the rabbet, and said plate having a hole extending from the recessed portion through to its opposite face, a resilient metal disc valve associated with said supporting plate having its periphery resting in said rabbet and having a central hole within the outline of the valve seat, and a two-part device having a passage with the valve structure arranged in the passage, having the periphery of the plate gripped between said two parts, the periphery of the valve being projected between the two parts, and a compressible gasket arranged between one of the parts and the plate overlapping the periphery of the valve, and means for fastening the two parts together, gripping the plate, the periphery of the valve and the gasket between them in gastight relation, whereby when the central portion of the valve moves from its normal position, its periphery may slide between the rabbeted portion of the plate and the gasket.

6. In a valve structure, supporting members having wall portions substantially aligned with each other and formed to provide a valve passage between said members, a valve plate having its periphery resting on the wall portion of one of said members provided with a valve seat on one side, a recess surrounding said seat and a rabbet surrounding said recess, a flexible metal valve having its periphery seated in said rabbet, a gasket between the valve plate and the second of said members, said gasket and the wall portions of said second member overlying the peripheral edge of said valve plate, and means for fastening said members together, whereby the gasket is gripped between the second member and the valve plate and overlies the joint at the periphery of the valve.

CHARLES G. ADSIT.